SYSTEM FOR REDUCING LOW FREQUENCY VARIATIONS IN THE AVERAGE VALUE OF A SIGNAL

Filed Jan. 3, 1966 2 Sheets-Sheet 1

United States Patent Office 3,418,425
Patented Dec. 24, 1968

3,418,425

SYSTEM FOR REDUCING LOW FREQUENCY VARIATIONS IN THE AVERAGE VALUE OF A SIGNAL

Gordon B. Thompson, Ottawa, Ontario, Canada, assignor to Northern Electric Company Limited, Montreal, Quebec, Canada Filed Jan. 3, 1966, Ser. No. 518,337
6 Claims. (Cl. 178—7.1)

ABSTRACT OF THE DISCLOSURE

A circuit, having particular utility with respect to the transmission of video signals, is described. Such signals would typically contain recurring reference pulses which are clamped to a specific potential. Upon subsequent passage through amplifiers, low frequency distortion or ringing is introduced whenever there is a substantial change in the information content of the signal. To avoid such distortion, the circuitry disclosed "unclamps" the signal prior to transmission. Thus the signal transmitted will have a constant average value, or a value in correspondence with the average value, regardless of information content. Accordingly, low frequency variations normally introduced on passage through subsequent amplifiers, do not appear.

This invention relates to a signal transmission system, and more particularly, it relates to a device for unclamping a signal.

The invention, both in its general aspects and its specific form, will best be understood after a preliminary discussion of the accompanying drawings, in which.

The signal transmission system of the present invention will, for purposes of illustration, be described with reference to television signals, but it will be recognized that the device and the teachings of this invention may be applied wherever there is a signal having a series of information intervals bounded by regular periodic timing flags or synchronizing pulses, for example in data transmission systems.

Figure 1:
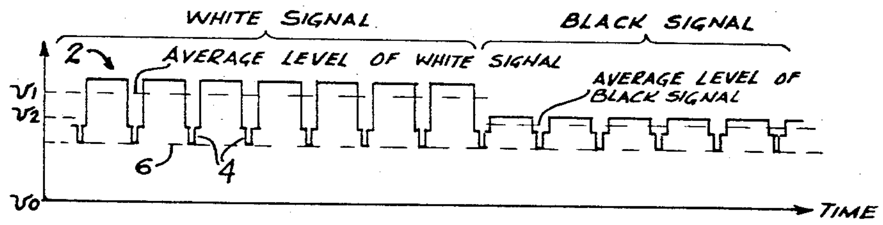
FIGURE 1 shows the waveform of a typical clamped video signal.

A typical television signal 2 as it is usually generated, and including both white and black portions, appears in FIGURE 1 of the drawings, $v_0$ being a reference or datum voltage. The signal shown in FIGURE 1 is clamped or D.C. restored, i.e. the tips of the sync pulses 4 all line up at the same clamping voltage level 6 whether the signal is white or black, in consequence of which the average value $v1$ of the white signal is considerably higher than the average value $v2$ of the black signal.

Figure 2:
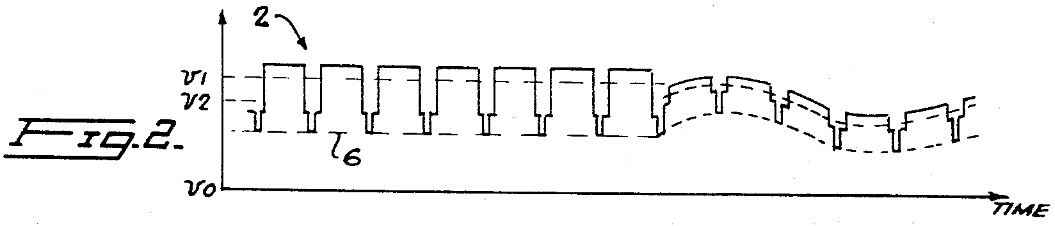
FIGURE 2 shows the signal of FIGURE 1 after passage through an amplifier subject to ringing.

As may be seen, when a shift occurs from a white signal to a black signal (or vice versa), there is a large change in the average level of the signal, and this large change often causes "ringing" in amplifiers through which the signal of FIGURE 1 is subsequently transmitted. The type of distortion commonly caused by such ringing is shown in FIGURE 2, where it is assumed that the video signal 2 has just passed through an amplifier subject to ringing. It may be observed in FIGURE 2 that the video signal 2, after a white to black transition, oscillates for sometime before settling down with the tips of its sync pulses 4 realigned at the clamping level 6. In other words, a low frequency distortion component is introduced into the signal as a result of amplifier reaction to the sudden change in signal level, and this distortion is often aggravated by further amplifiers through which the signal 2 may be passed. Therefore, clamping or D.C. restoration is required to remove the low frequency distortion component and restore the waveform to that shown in FIGURE 1. However, once the signal is restored to the form shown in FIGURE 1, its passage through further amplifiers causes more of the difficulties just described, so that clamping circuits are required at repeated intervals along the signal transmission paths, and this becomes expensive.

If the time average of the signal level were to remain substantially constant during shifts from white to black or vice versa, no "ringing" would be caused in amplifiers along the signal transmission path, and hence it would not be necessary to provide an array of clamping circuits at intervals along the transmission path. Ideally, such a signal ought to look as shown at 8 in FIGURE 3, where it may be observed that the average voltage level 10 of the signal remains the same whether a white signal or a black signal is being transmitted. This signal may be considered as being "unclamped" because the tips of its sync pulses 4 do not line up at a common level. Because the average value of the signal shown in FIGURE 3 remains substantially constant, there are no step function shifts in average value to cause amplifier ringing of the type shown in FIGURE 2.

Figure 3:
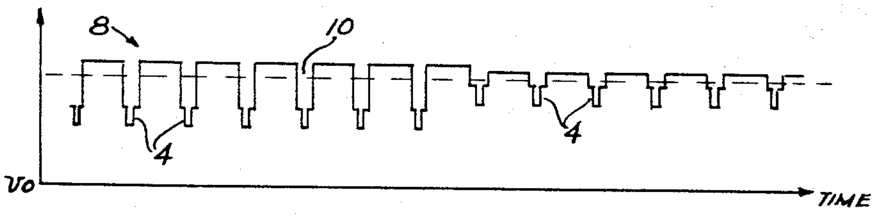
FIGURE 3 shows an ideal unclamped video signal waveform.

Unfortunately, a signal of the type shown in FIGURE 3 is not readily available. Conventional signal generating means for providing a video signal including synchronizing information almost invariably provide a signal of the type shown in FIGURE 1, such signal having its sync tips clamped at a common level. Accordingly, it is an object of the present invention to provide a circuit for reducing low frequency variations in the average level of a signal such as that shown in FIGURE 1. In other words, it is an object of the present invention to provide a circuit that will substantially unclamp the signal, converting it to a form somewhat as shown in FIGURE 3 (with a qualification to be discussed later) so that it may be passed through assorted amplifiers without causing ringing problems.

A signal could of course be unclamped simply by inserting a capacitor in the signal transmission path. This would remove the D.C. components and leave the signal as an A.C. signal. However, with such an arrangement, every time the signal shifted from white to black or vice versa, the charge on the capacitor would be required to adjust itself, and such adjustment would occur relatively slowly, introducing undesirable effects into the picture. It is found, for example, that the phase-frequency characteristics of such an arrangement cause streaking in the picture.

The principle on which the present invention operates is as follows. Consider the white portion of the signal 2 of FIGURE 1. It will be noted that if a voltage equal to the average value $v1$ of the white signal were subtracted from the white signal, then the new average value of the resulting white signal would be located at the reference voltage $v_0$. Similarly, if a voltage equal to the average value $v2$ of the black signal were subtracted from the black signal, then the new average value of the resulting black signal would also be located at reference voltage $v_0$. This situation is shown in FIGURE 4, where signal 2 is shown in dotted lines and reference numeral 2′ denotes the signal obtained by subtracting from the signal 2 a voltage equal to its own average value.

Figure 4:
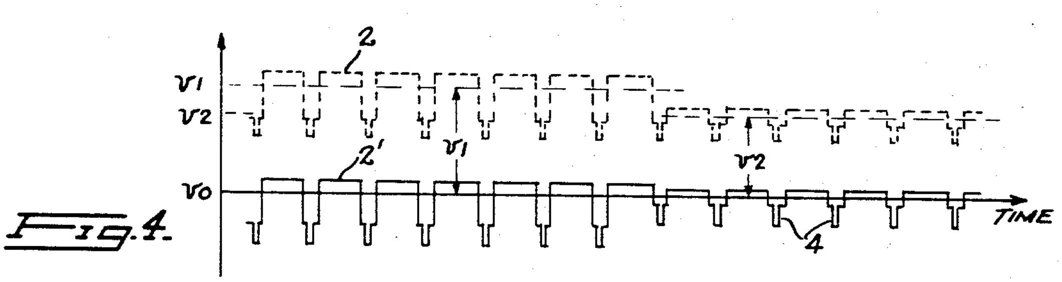
FIGURE 4 shows the waveform of FIGURE 1 after being unclamped.

It will be noticed that the signal 2′ of FIGURE 4 now looks exactly like the signal 8 of FIGURE 3, i.e. the average value of signal 2′ remains constant whether the signal is white or black, which is what is desired. In other words, a clamped signal may be unclamped by subtracting therefrom a voltage equal to its own average value. It will be evident that subtraction of a voltage differing from the average value by a constant will also accomplish the same result; the effect of the constant will merely be to displace the D.C. level of the average value of the output voltage.

Figure 5:
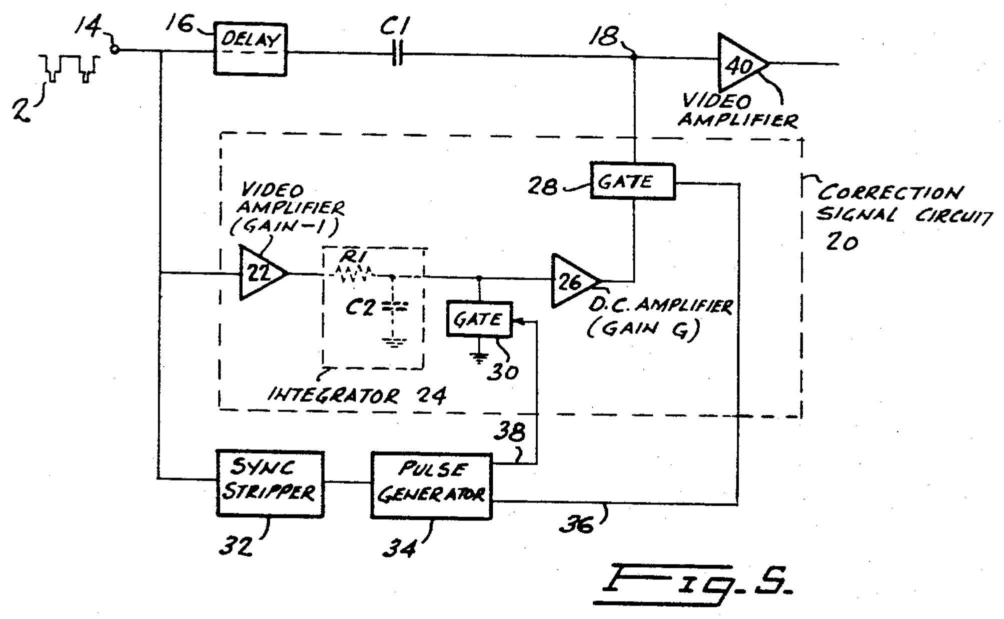
FIGURE 5 shows a circuit for the present invention.

This result is substantially accomplished by the circuit of FIGURE 5, in which an input signal such as video signal 2 is applied to an input terminal 14. From input terminal 14, a main signal path, comprising delay element 16 and storage capacitance C1, is connected to an output terminal 18. Delay element 16 is shown in dotted lines for reasons that will be explained presently.

Also connected between the input terminal 14 and the output terminal 18 is a correction signal circuit indicated generally at 20. The correction signal circuit 20 includes a video amplifier 22 connected to input terminal 14 and having a gain of −1. Amplifier 22 drives an integrator generally indicated at 24. The integrator 24 is shown diagrammatically as having a series resistance R1 and an equivalent capacitance C2, but in practice, a simple RC integrator will not normally be used since such a circuit does not provide satisfactory integration where the output integrated waveform is an appreciable fraction of the input voltage to the integrator. Instead, an integrator providing more accurate integration, for example the operational amplifier integrator shown and described at pages 623 and 624, Terman, "Electronic and Radio Engineering," fourth edition, McGraw-Hill, may conveniently be used. Alternatively, the conventional Miller integrator may be employed.

The integrator 24 is connected to a D.C. amplifier 26 having a high input impedance, a low output impedance, and a gain of G. The nature of gain G will be discussed shortly. The output of amplifier 26 is connected through a first normally open gate 28 to the output terminal 18. A second normally open gate 30 is connected to the integrator 24 to "empty" the same, i.e. to discharge the integrating capacitance after its integrating functions are performed, as will be explained shortly.

The gates 28 and 30, which are of conventional construction (such as a diode ring gate), require appropriately timed gating pulses for their operation. Therefore a sync stripper 32 is provided to produce separated sync pulses. The separated sync pulses control a pulse generator 34 which has two outputs 36 and 38. At output 36, the pulse generator produces keying pulses synchronized with the sync pulses appearing at output terminal 18, while at output 38 it produces keying pulses delayed a few microseconds (e.g. 7 to 9 microseconds) from the pulses at output 36. Output 36 is connected to gate 28 and output 38 is connected to gate 30.

Figure 6:
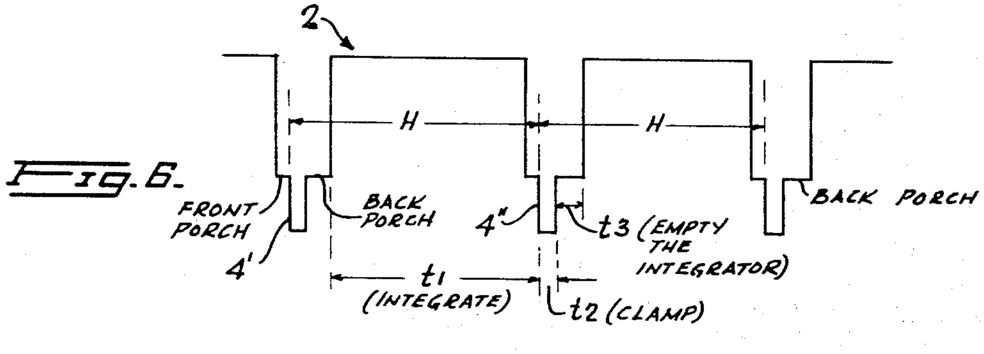
FIGURE 6 is a timing diagram for the circuit of FIGURE 5.

The operation of the FIGURE 5 device may be best appreciated with reference to FIGURE 6, where a typical portion of the video signal 2 of FIGURE 1 is shown as applied to input terminal 14 of FIGURE 5. It should be remembered that the purpose of the FIGURE 5 device as now to be described is to generate a correction signal equal to (or differing by a constant from) the negative of the average value of the input signal in each cycle, and to subtract such correction signal from the sync pulse located at the beginning of the cycle.

The signal 2 is shown as including two sync pulses 4′ and 4″, the time for one horizontal sweep cycle or line being the interval H between the leading edges of the two sync pulses. As the input signal 2 varies, its inverse, as produced by video amplifier 22, is integrated, integration typically commencing at the end of the back porch following sync pulse 4′ and continuing for a time $t1$, until the leading edge of sync pulse 4″. The portion of the signal constituted by the back porch and sync pulse is thus omitted from the integration, but the contribution of this part of the signal to the average value is substantially constant and may be ignored or else compensated for by an adjustment in the D.C. output level of amplifier 26.

The output signal from the integrator 24 is now proportional to the negative of the integral (over time $t1$) of the input signal. However, the correction signal required is the negative of the average value of the input signal during time $t1$ (ignoring the substantially constant values contributed by the non-integrated portion of the cycle). Therefore, a division of the integrator output signal by the integration interval $t1$ is required. In addition, an integrator will usually provide an output signal equal to the integral of the input signal multiplied by some proportionality factor $k$ imposed by the characteristics of the integrator. This factor $k$ must also be removed from the correction signal, in order that it properly represent the negative of the average value of the signal over time $t1$. These two factors, namely, the division required by time $t1$, and the removal of the factor $k$ introduced by the integrator characteristics (and by other circuit components if necessary) may be dealt with by appropriate adjustment of the gain G of amplifier 26.

More specifically, if the input signal to video amplifier 22 during any particular integration period $t1$ is represented by $e_{in}$, then the correction voltage $e_c$ desied from the output of amplifier 26 at the end of the integration interval is (ignoring constant values contributed by the non-integrated portion of the cycle) the negative of the average value of signal $e_{in}$ during period $t1$, i.e.:

$$e_c = \frac{-\int_0^{t1} e_{in}\,dt}{t1}$$

The output signal $e_0$ generated by the integrator 24 will depend upon the integrator characteristics. If for example the integrator 24 takes the form of the operational amplifier integrator shown in Terman, previously referred to, then since the input signal to the integrator is $-e_{in}$, the integrator output signal $e_0$ is:

$$e_0 = -\frac{1}{R1C2}\int_0^{t1} e_{in}\,dt$$

where $1/R1C2$ is the integrator proportionality factor $k$, R1 being the integrator series resistance and C2 being the equivalent integrator capacitance.

It is apparent that for the amplifier 26 to transform the integrator output signal $e_0$ to the desired corection signal $e_c$, amplifier 26 must in the example under consideration have a gain G equal to $R1C2/t1$. In other words, gain G is equal to +1 divided by the product of the integrating interval $t1$ and the integrator proportionality factor $k$.

The correction voltage at the output of amplifier 26 is, at the end of time $t1$, ready to be added to the signal that passes through the main signal path and appears at output terminal 18. Ideally, this correction voltage should as mentioned be added to sync pulse 4′, so that the signal during each horizontal sweep cycle will have subtracted therefrom a voltage equal to its own average value. Therefore, delay element 16 delays the passage of the signal through the main signal path so that sync tip 4′ arrives at output terminal 18 at the time when the integration of the horizontal sweep cycle of which it forms a part has been completed by correction signal circuit 20. The gate 28 is now operated by a gating pulse from pulse generator output 36 and closes during time $t2$ to add the correction voltage to the sync pulse 4′, i.e. to clamp this sync pulse to the negative of the average value of the signal during the horizontal sweep cycle of which it forms a part. At the end of time $t2$, which may conveniently be about the length of the sync pulse, gate 28 opens and gate 30 is operated by a gating pulse from output 38 to close for a short period of time indicated at $t3$, thus to empty the integrator 24, i.e. to reduce the voltage at its output down to a constant starting level. At the end of time $t3$, which may conveniently be at the end of the back porch interval, gate 30 opens and capacitor C2 commences charging anew.

It will be realized that the gains of the amplifiers 22 and 26, need not be $-1$ and $+G$ respectively. They could have other values, the important point being that the product of the gains be equal to $-1$ divided by the product of the integrator proportionality factor $k$ and the integrating interval $t1$, so that the correction signal in any cycle will be equal to or differ by a constant from the negative of the average value of the input signal during that cycle.

The output terminal 18 (FIGURE 5) should look into a high following impedance, and a video amplifier 40 may be provided for this purpose.

Figures 7A, 7B:
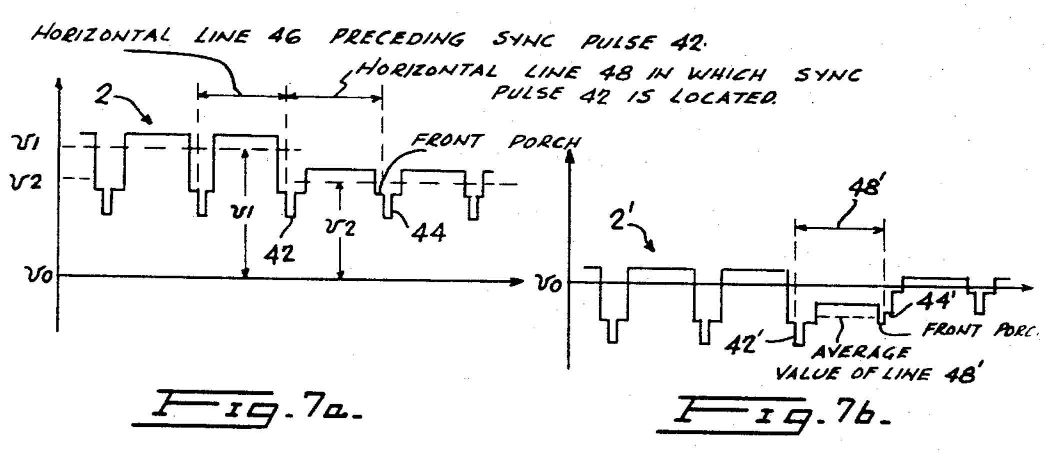
FIGURES 7 and 8 show input and output signals for the circuit of FIGURE 5 without a delay element.

It may be noted that in practice, realization of a delay element 16 able to delay the signal by an interval corresponding to one horizontal line length is extremely costly. In addition, many delay lines presently available may introduce distortion and frequency response problems. Therefore, in the preferred embodiment of the invention, delay element 16 is omitted (this being why it is shown in dotted lines in FIGURE 5) and the input signal applied at terminal 20 is passed straight through capacitor C1 to terminal 18. In this case the signal during each synch pulse will be clamped to the negative of the average value of the signal during the preceding horizontal line. The situation is as shown in FIGURE 7A, which shows the signal 2 of FIGURE 1 with a sync pulse 42 at the white to black transition and a following sync pulse 44. The horizontal line or cycle preceding pulse 42 is identified at 46, while the line or cycle of which pulse 42 forms a part is identified at 48. With the delay element 16 present, the voltage added to pulse 42 will be $-v2$, and this will bring the average value of horizontal line 48 down to the $v_0$ axis, as is desired. Without the delay element 16, the voltage added to sync pulse 42 will be $-v1$ (the negative of the average value of the signal during the preceding horizontal line 46). This will bring the new average level of line 48 down below the $v_0$ axis. The resulting output signal 2' is shown in FIGURE 7B, where printed reference characters denote features corresponding to those of FIGURE 7A. It will be noted however that the voltage added to the sync pulse 44 immediately following pulse 42 will be $-v2$, so that the average level of the output signal 2' during the horizontal line of which pulse 44 forms a part will be restored to the $v_0$ axis.

Figure 8A:
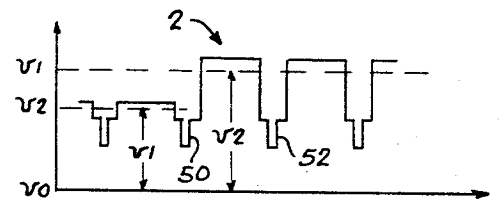
Figure 8B:
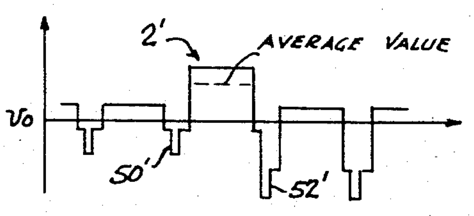

In short, the effect of clamping the sync pulses to the negative of the average value of their individually preceding lines is to add a brief one line discontinuity at white to black transitions. A similar discontinuity arises at black to white transitions and is illustrated in FIGURES 8A and 8B, where the input signal is again indicated at 2 and the output signal at 2'. The input signal sync pulse at the black to white transition is indicated at 50, the following sync pulse being 52. Since pulse 50 has only voltage $v1$ subtracted therefrom, rather than voltage $v2$, the average level of the line of which pulse 50' in the output signal forms a part is too high, but this defect is soon remedied by subtracting the correct voltage $v2$ from the next sync pulse 52.

The above discussed discontinuity, which occurs each time there is a change in average level of the input signal, will result, if the signal is changing level at each line, in an up and down jogging of the output signal from one horizontal line to the next. In other words, there is added to the video signal a random pulse of one line length, of random height and random polarity. This added distortion signal has practically no components below approximately half the line rate, i.e. about 7.5 kc. This frequency lies well within the pass band of normal transmission apparatus and will not normally cause distortion during transmission of the signal therethrough. Once the signal has been appropriately processed by the signal transmission apparatus, it may be reclamped, at which time the random component just mentioned will be removed.

In practice it may be desirable to provide a slight time delay in the main signal transmission path, to equalize the timing in it and in the correction signal circuit (so that the voltage subtracted from a sync pulse will in fact be substantially the average value of the signal during the preceding horizontal line).

It may be noted that since the subtraction operation above described is performed with a relatively high repetition rate, i.e. at the line rate, this device serves to remove low frequency hum from the input signal.

As previously mentioned, it will be realized that this invention may be applied to systems other than television systems. For example, it may be applied to data systems where clock pulses are employed.

I claim:

1. A circuit for reducing low frequency variations in the average voltage level of an input signal of a type containing successive cycles, said cycles being of equal duration and each comprising a timing pulse followed by an information interval, said cycles occurring at a repetition rate substantially higher than said low frequency, said circuit comprising:

(a) input means for said input signal,
(b) output means for an output signal,
(c) a storage capacitance having one side coupled to said input means and its other side coupled to said output means,
(d) means coupled to said input means for sampling said input signal and for generating at the end of each cycle thereof a correction voltage differing substantially only by a constant from the negative of the average value of the input signal during said cycle, where said constant may have a value of zero,
(e) and means coupled to said other side of said storage capacitance for adding to each timing pulse thereat the correction voltage generated during a cycle having an information interval adjacent such timing pulse,
(f) said means (d) including
  (i) first amplifier means coupled to said input means and having a first gain, to provide a first signal equal to said input signal multiplied by said first gain,
  (ii) integrating means coupled to said first amplifier means, said integrating means integrating said first signal during a portion of a cycle of said first signal including at least a said information period, to produce a voltage equal to the integral of said first signal over said portion multiplied by a proportionality factor imposed by the characteristics of said integrating means,
  (iii) further amplifier means having a high impedance input and a low impedance output and a second gain, said high impedance input being connected to said integrating means and said correction voltage being derived at said low impedance output,
  (iv) the product of said first and second gains being equal to minus one divided by the product of said proportionality factor and the duration of said portion,
  (v) a first normally open gate connected to said integrating means and operable to discharge said integrating means after said correction voltage has been applied to the signal at said other side of said storage capacitance,
(g) and said means (e) includes a second normally open gate coupled between said low impedance output and said other side of said storage capacitance, said second gate being operable to close during the first part of each of said timing pulses at said other side of said storage capacitance to add thereto said correction voltage.

2. A circuit according to claim 1 including pulse generating means responsive to said timing pulses for generating a first set of pulses coinciding with said timing pulses at said other side of said storage capacitance, for operating said second gate, and for generating a second set of pulses each pulse of which is delayed from corresponding pulses of said first set by an interval approximating the duration of a said timing pulse, for operating said first gate.

3. A circuit for reducing low frequency variations in the average voltage level of an input signal of a type containing successive cycles, said cycles being of equal duration and each comprising a timing pulse followed by an information interval, said cycles occurring at a repetition rate substantially higher than said low frequency, said circuit comprising:

(a) input means for said input signal, (b) output means for an output signal, (c) a main signal path connected between said input means and said output means, said main signal path including a storage capacitance in series therein, said input signal passing through said main signal path with a predetermined time delay, (d) correction signal means connected between said input means and said output means, said correction signal means including (i) integrating means including integrating capacitance means, said integrating capacitance means accumulating, during a portion of a cycle of said input signal including at least a said information period, a voltage equal to the integral of said input signal over said portion multiplied by a proportionality factor imposed by the characteristics of said integrating capacitance means, (ii) amplifier means coupled to said integrating capacitance means and having an amplifier output having a low output impedance, for producing at said amplifier output a correction voltage varying with the voltage accumulated by said integrating capacitance means, the correction voltage at the end of each cycle differing substantially only by a constant from the negative of the average value of the input signal during such cycle, where said constant may be zero, (iii) first normally open gate means coupled between said amplifier output and said output means and operable in response to timing pulses synchronized with the timing pulses at said output means to close and add the correction voltage then at said amplifier output means to the timing pulse present at said output means, (iv) and second normally open gate means connected to said integrating capacitance means and operable to discharge said integrating capacitance means after each addition to the correction voltage to a timing pulse, (e) said delay in said main signal path being such that the correction voltage added to each timing pulse at said output means is the correction voltage generated during a cycle having an information period adjacent said timing pulse.

4. A circuit acording to claim 3 wherein said time delay is such that the correction voltage added to each timing pulse at said output means is the correction voltage at the end of the cycle immediately preceding such timing pulse.

5. A circuit according to claim 4 wherein said correction signal means includes further amplifier means coupled between said input means and said integrating means, the product of the gains of said first mentioned amplifier means and said further amplifier means being equal to minus one divided by the product of said proportionality factor and the duration of said portion.

6. A circuit according to claim 5 wherein said input signal is a video signal, said timing pulses being sync pulses, said circuit including:

(f) means for separating said sync pulses, (g) and pulse generating means coupled to said means (f) and having first and second outputs, said first output being coupled to said first gate means and said second output being coupled to said second gate means, said pulse generating means generating at said first output a first set of gating pulses synchronized with the sync pulses at said output means, for operating said first gate means, said pulse generating means generating at said second output a second set of gating pulses delayed from said first set of gating pulses by an interval approximating the duration of a said sync pulse, for operating said second gate means.

References Cited

UNITED STATES PATENTS 2,210,995 8/1940 White ............... 178—6

ROBERT L. GRIFFIN, *Primary Examiner.*

ROBERT L. RICHARDSON, *Assistant Examiner.*

U.S. Cl. X.R.

328—162